United States Patent
Edmonds et al.

(10) Patent No.: US 6,230,190 B1
(45) Date of Patent: *May 8, 2001

(54) SHARED-EVERYTHING FILE STORAGE FOR CLUSTERED SYSTEM

(75) Inventors: Paul Edmonds, Palo Alto; Yi Zhang, Sunnyvale; Chang Xu; Priyen Doshi, both of San Jose; Stephen Co, San Ramon; Michael P. Tel, Sunnyvale; Andy Chan, Milpitas, all of CA (US)

(73) Assignee: Openwave Systems Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,360

(22) Filed: Oct. 9, 1998

(51) Int. Cl.[7] .................................................. G06F 15/167
(52) U.S. Cl. ............................................. 709/213; 709/216
(58) Field of Search .................................... 709/213, 214, 709/216, 200, 203, 229

(56) References Cited

U.S. PATENT DOCUMENTS

| | | | |
|---|---|---|---|
| 4,787,026 | * 11/1988 | Barnes et al. | 346/200 |
| 4,799,145 | * 1/1989 | Goss et al. | 364/200 |
| 4,814,982 | * 3/1989 | Weir | 364/200 |
| 5,027,271 | * 6/1991 | Curley et al. | 364/200 |
| 5,163,131 | * 11/1992 | Row et al. | 709/200 |
| 5,191,652 | * 3/1993 | Dias et al. | 709/200 |
| 5,388,242 | * 2/1995 | Jewett | 395/425 |
| 5,394,532 | * 2/1995 | Belsan | 395/425 |
| 5,414,845 | * 5/1995 | Behm et al. | 395/650 |
| 5,511,224 | * 4/1996 | Tran et al. | 395/800 |
| 5,623,666 | * 4/1997 | Pike et al. | 395/616 |
| 5,764,972 | * 6/1998 | Crouse et al. | 395/601 |
| 5,961,623 | * 10/1999 | James et al. | 710/113 |
| 6,065,037 | * 5/2000 | Hit et al. | 709/200 |
| 6,151,684 | * 11/2000 | Alexander et al. | 714/4 |

OTHER PUBLICATIONS

Ray Alderman, "No Free Lunch In Multiprocessing," *Eletronic Design*, p. 94, Jul. 20, 1998.

Peter Varhol, "Symmetric multiprocessing goes real–time," *Computer Design*, pp. 47–54, Aug. 1998.

"Microsoft Cluster Server," Microsoft Corp., 19 pgs., Sep. 11, 1998, downloaded from www.microsoft.com.

"SecureShare™: Guaranteed Multiprotocol File Locking," 18 pgs., 1998, downloaded from www.netapp.com/technology.

"WSD Redundancy—Software Version 4.20," RND Networks, Inc., product information, downloaded from WWW. on Jun. 22, 1998, 5 pages.

"Server Management in the WSD," RND Networks, Technical Application Note 1025, Oct. 8, 1997, 7 pgs.

"WSD for Distributed Sites (WSD–DS)," RND Networks, Technical Application Note 1035, downloaded from WWW. on Jun. 22, 1998, 20 pgs.

"DNS And The WSD," RND Networks, Technical Application Note 1045, Jun. 1, 1998, 15 pgs.

"TCP Port Multiplexing in the WSD–PRO," RND Networks, Technical Application Note 1010, downloaded from WWW. on Jun. 22, 1998, 7 pgs.

* cited by examiner

*Primary Examiner*—Zarni Maung
(74) *Attorney, Agent, or Firm*—Fish & Richardson P.C.

(57) ABSTRACT

A computer system has a plurality of processors, each processor executing an independent operating system image without sharing file system state information. The system includes an active backplane coupled to the plurality of processors; and one or more data storage devices coupled to the active backplane for satisfying data requests from the plurality of processors, each of the data storage devices being adapted to secure a file when one processor writes to the file and to release the file when the processor completes operation on the file.

21 Claims, 10 Drawing Sheets

SHARED-EVERYTHING FILE STORAGE FOR CLUSTERED SYSTEM

BACKGROUND

The invention relates to scalable and fault-tolerant computer systems.

The need for fast, reliable and secure access to vast amounts of shared data worldwide has been driving the growth of multiprocessing paradigm in which applications, data storage, processing power, and other resources are distributed among a pool of processors. A number of architectures have been developed over time to address the requirements of multiprocessing. Depending on the resources that the processors share, multiprocessing architectures may be classified into three classes: share everything architecture, shared nothing architecture, and shared something architecture.

One example of a shared-everything architecture is a Symmetric Multiprocessing (SMP) architecture. An SMP system is capable of scaling multi-process or multi-threaded loads so that application code can run on any processor in the system without software changes. Adding new throughput to the SMP system may be as simple as adding a new CPU board, provided the operating system can take advantage of it. Implementations of SMP generally provide a plurality of CPU and memory boards which communicate with each other and with input/output boards over a wide and fast bus.

The SMP approach demands close communications between processors. The maintenance of consistency between processors is also non-trivial. The overhead and complexity of the consistency protocols may adversely affect the scalability of the SMP 30 architecture. Further, processors in the SMP architecture typically share one copy of the operating system. In addition to limiting the scalability of the SMP architecture, the sharing of the copy of the operating system creates a potential for many single points of failure occurring when many resources are shared.

One commonly used technique to provide fault-tolerance (fail-over) depends on a client application to recognize when a server is unavailable to satisfy a request, and if so, either to locate another server or to deny the request altogether. For example, object techniques such as CORBA or Microsoft's Component Object Model (COM) and Distributed Component Object Model (DCOM) may be used to implement this technique. These object architectures require a one-to-one relationship between the client and the server. If the server fails for any reason, the client needs to handle the failure either by finding another server that can perform the same service or by handling an error condition. These approaches require complex and time-consuming communication set-ups to provide sufficient fault tolerance for applications.

Another system supporting fail-overs for server processes, available from Microsoft Corp. of Redmond, Washington, is called Microsoft Cluster Server (MSCS). The MSCS system uses a hot-standby technique in which a primary server and a standby server send "keep alive" messages back and forth so that the standby server is activated if it cannot contact the primary server. This is a time consuming fail-over process. Further, the system is inefficient since computer resources of the standby server are not used until a failure occurs.

SUMMARY OF THE INVENTION

A computer system has a plurality of processors, each processor executing an independent operating system image without sharing file system state information. The system includes an active backplane coupled to the plurality of processors; and one or more data storage devices coupled to the active backplane for satisfying data requests from the plurality of processors, each of the data storage devices being adapted to secure a file when one processor writes to the file and to release the file when the processor completes operation on the file.

Implementations of the invention include one or more of the following. The active back plane may be a switch. The switch may also be an Ethernet switch. Each data storage device may be a redundant array of inexpensive disk (RAID) device. Each data storage device may also be a network data storage device. A file sharing protocol may be supported by the processor and the data storage system. A means for locking a file may be provided on the data storage device. A byte range locking means may also be provided for controlling access to the data storage device. A cellular switch may be connected to the processors. Further, one or more applications selected from a group consisting of telephony applications, speech recognition applications, electronic mail applications, personal information management applications, and Web agent applications.

In a second aspect, a method for providing file storage in a computer system includes: executing on each processor of a plurality of processors an independent operating system image without sharing file system state information; communicating data over an active backplane coupled to the plurality of processors; and transferring data from one or more data storage devices coupled to the active backplane in satisfying data requests from the plurality of processors, each of the data storage devices being adapted to secure a file when one processor writes to the file and to release the file when the processor completes operation on the file.

Implementations of the invention include one or more of the following. The communicating step includes routing data using a switch, which may be an Ethernet switch. Data may be stored in a redundant array of inexpensive disk (RAID) device. The transferring step includes accessing one or more network data storage devices. Data may be communicated using file sharing protocol. A file on the data storage device may be locked, or alternatively, a byte range on the data storage device may be locked. Data may be received by a cellular switch connected to the processors. One or more applications may be executed on the system, the applications selected from a group consisting of telephony applications, speech recognition applications, electronic mail applications, personal information management applications, and Web agent applications. Additionally, the applications may be selected from a group consisting of facsimile applications, synchronization applications, short message system (SMS) delivery applications, and pager applications.

Advantages of the invention include the following. The invention provides scalability and fault tolerance. The invention allows many servers to perform the same task in an active/active scalable manner. The invention also supports load balancing among a pool of like servers. By providing a client process with access to a pool of like servers which are load balanced, the invention keeps the response time for each request to a minimum. Thus, the invention supports high data availability, fast access to shared data, and low administrative costs through data consolidation. Additionally, the invention may be built using standard off-the-shelf components to reduce overall system cost.

DESCRIPTION

Figure 1:
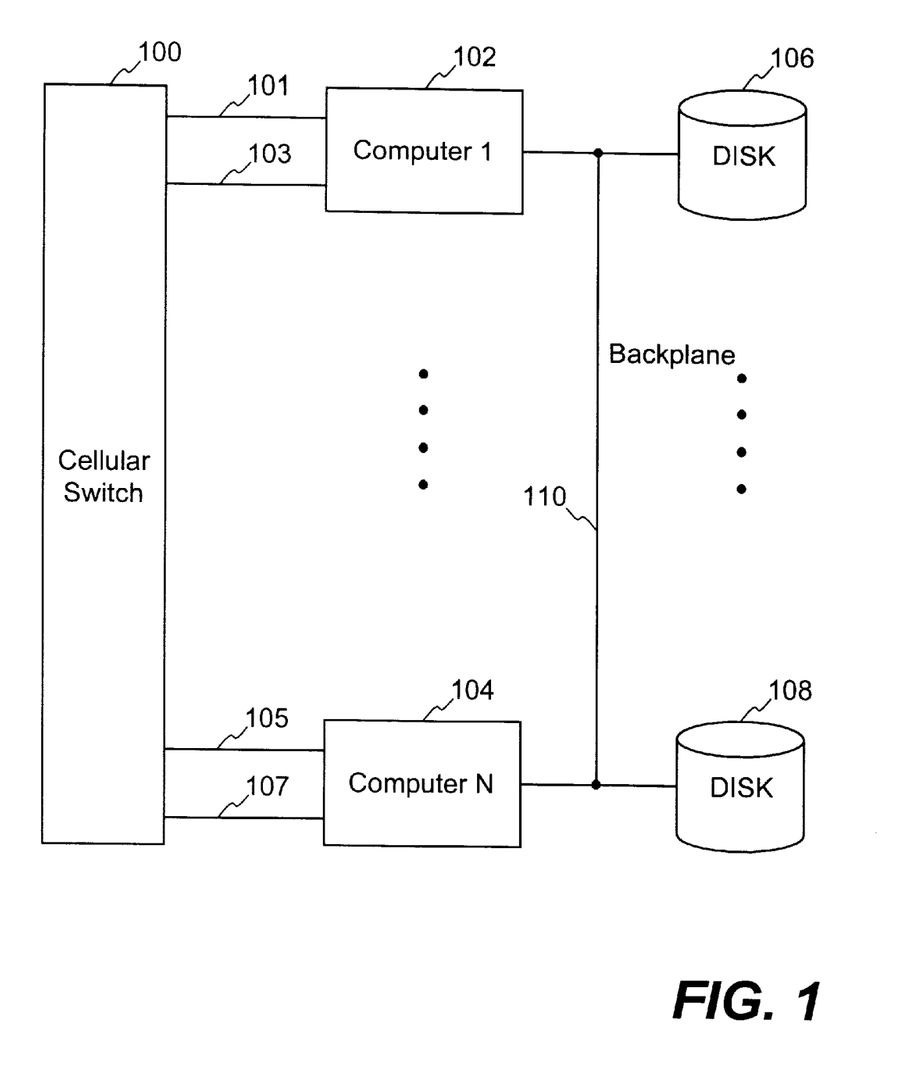
FIG. 1 is a block diagram illustrating a first computer system.

FIG. 1 shows a computer system in accordance with the present invention. Telephone calls from a plain old telephone service (POTS) network are received by a cellular switch 100. The cellular switch 100 transfers the telephone calls to a plurality of computers 102 and 104 over multiple T1 line pairs 101–103 and 105–107.

The interface to the cellular switch 100 at each of T1 line pairs 101–103 or 105–107 receives analog voice signal from the network, bandpass-filters and conditions the signal by the line interface and then applies the signal to a CODER/DECoder (CODEC) circuit. The CODEC filters, samples, and digitizes the inbound analog audio signal and passes this digitized audio signal for subsequent digital signal processing (DSP). For outbound data, the interface expands stored, compressed audio data for playback; adjusts the volume and rate of speed of playback upon application or user request; and generates tones such as DTMF, MF, or any application-defined general-purpose tone as needed.

Each of computers 102 and 104 communicates with each other over an active backplane 110. Additionally, multiple data storage devices 106 and 108 are also connected to the active backplane 110. The active backplane 110 may be an Ethernet switch such as a Cisco 2900 switch, available from Cisco Systems, Inc. of San Jose, Calif. The active backplane 110 optimizes the Ethernet network by dividing it into multiple smaller, more efficient collision domains, or segments. Individual segments created by the active backplane 110 can consist of one computer, like a file server, a group of computers, or even the entire business network. The active backplane 110 provides point to point bi-directional communication among many nodes such that each node has a full bandwidth access to the data storage device 106 or 108. Each of data storage devices 106 and 108 is a network Redundant Array of Independent Disk (RAID) data storage system. Each network RAID data storage system 106 or 108 connects directly to the active backplane 110. The network RAID data storage system may be a RAID array available from Network Appliances, Inc. which attaches directly to an Ethernet backplane 110 such as a 10 Mbit, a 100 Mbit, or a 1 Gbit Ethernet backplane 110.

The network RAID data storage devices 106 or 108 includes a redundant RAID controller and is fully fault tolerant. As such, the network RAID data storage device 106 or 108 is a collection of disks under hardware or software control such that a single drive failure does not bring the system of FIG. 1 down. The network RAID data storage device 106 or 108 also guards against fan and power failures and provides remote failure notification.

Each of data storage devices 106 and 108 may be a RAID-1 system, in which every disk has a mirror image of its data stored on another disk. Alternatively, the data storage devices 106 and 108 may be a RAID-2 or RAID-3 sub-system which stripes user data across a group of data drives (typically four or eight drives per group). The data storage devices 106 and 108 may also be a RAID-4 or RAID-5 sub-system which stripes block (or sometimes groups of blocks) of data and stores the data entirely on an individual disk. Additionally, the operating system running on each data storage device 106 or 108 is optimized for file operations and has a thread-based non-preemptive multitasking environment. Data requests are transmitted over the active backplane 110 in accordance with a file sharing protocol, which is a special set of rules for communicating between a requester running on the computer 102 or 104 and the network RAID data storage system 106 or 108 so that client applications in a computer may read and write to files on the network RAID data storage system 106 or 108. Further, applications may request services from server programs in a computer network. Through the file sharing protocol, an application can access files at a remote server as well as other resources, including printers, mailslots, and named pipes, to read, create, and update files on the remote server. The protocol can also communicate with any server program that is set up to receive a client request.

The file sharing protocol includes the Common Internet File System (CIFS) for Microsoft-based systems or the Network File System (NFS) for Unix-based systems. Alternatively, the file sharing protocols may be the Server Message Block (SMB) protocol, which is used over the Internet on top of its TCP/IP protocol or on top of other network protocols such as IPX or NetBEUI. The file sharing protocol supported by the RAID data storage device 106 or 108 provides a locking facility which may be a file locking facility or a byte-range locking facility. The locking facility enhances data integrity for the file sharing environment of FIG. 1. Locking can be used to coordinate concurrent access to a file by multiple applications and users. It can prevent concurrent readers and writers of shared data from reading "stale" data (i.e., data currently in the process of being updated by another application) and/or overwriting each others' updates.

In file locking, the application requests that all other applications/users be denied read access to the file while the application holds the file open. If another application should attempt to try to open the file for reading (or reading and writing) while the file is already open with this deny-mode, the attempt fails. Alternatively, byte-range locking may be used to restrict other applications' access to sections of an open file, usually while the holder of the byte-range lock is intending to read or write the locked section. In certain implementations, byte-range locks can be obtained only on already open files.

For interprocessor communications, a messaging system is provided with a unified mailbox containing message pointer lists and reference counts. The CIFS file system lock and application real-time programming processes such as open, lock, update, close are provided for each application requiring access to the mailbox. Lock management and disk allocation strategy is handled by the CIFS file system running on the RAID controller 106 or 108. In this way, each application telephony server and electronic mail server can operate on the messaging system directly without the need of a single threaded file or database server. Thus, maximum scalability is supported.

Moreover, the CIFS protocol automatically frees locks if a network connection is lost after some programmable period of time. Any computer 102 or 104 in the system illustrated in FIG. 1 can fail regardless of the locks it has outstanding and not affect the operation of any other computer that wants to operate on the same data. Hence, each computer or node in the cluster can operate on the entire file system independent of the state or operation of other nodes.

Figure 2:
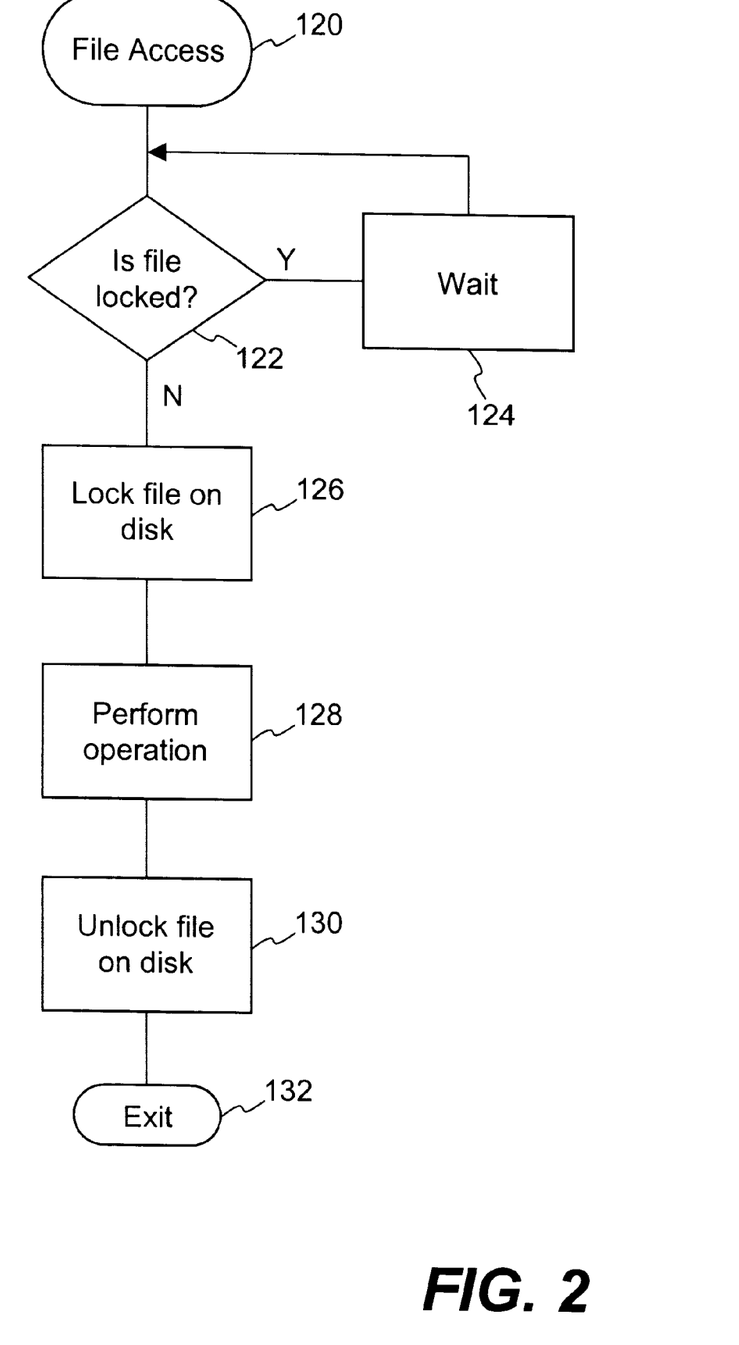
FIG. 2 is a flowchart illustrating a process for accessing files.

FIG. 2 is a flowchart illustrating a process 120 for accessing files stored on a data storage device is shown. The process 120 locks files at appropriate times such that any application can operate on the entire file system as if it owned the entire data storage device 106 or 108. The process 120 initially determines if the requested file in the particular data storage device has been locked (step 122). The file may be locked when another application has already accessed the file. If so, the process 120 waits for a predetermined period (step 124) before looping back to step 122 to check the file. If the file is available, the process proceeds to lock the file on the disk (step 126) and performs the requested data processing operation (step 128). Upon completion of the operation, the process 120 unlocks the file on the disk (step 130) before exiting (step 132).

Figure 3:
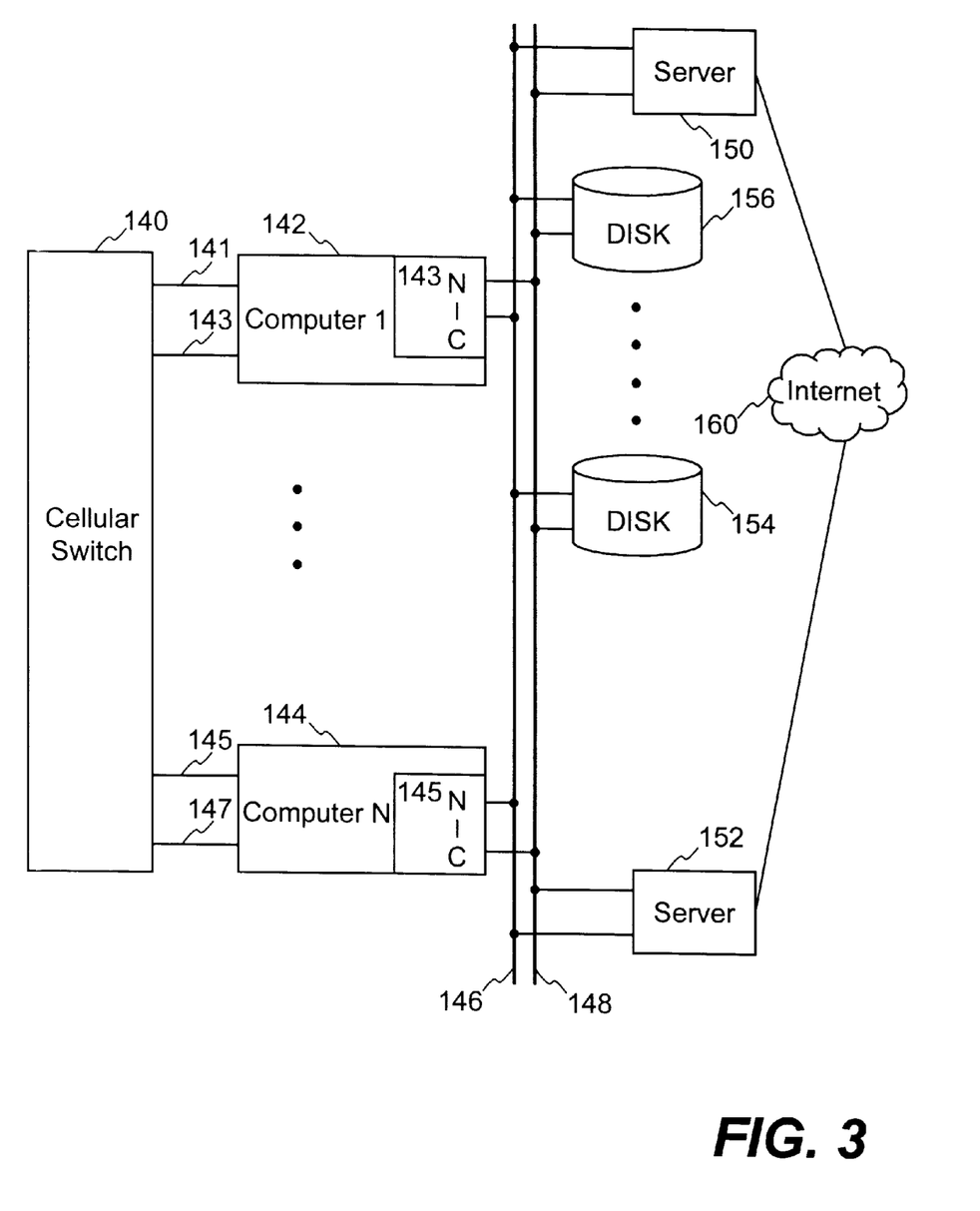
FIG. 3 is a block diagram illustrating a second computer system.

FIG. 3 shows a second computer system with redundant backplanes. As in the system of FIG. 1, voice data from the POTS network is presented to a cellular switch 140. The cellular switch 140 in turn distributes the incoming calls to a plurality of computers 142 and 144. The cellular switch 140 communicates with each of computers 142 and 144 over multiple T1 lines 141–143 and 145–147, respectively. The computers 142 and 144 in turn communicate with each other and with other peripheral devices over a redundant backplane with a first active backplane 146 and a second active backplane 148. The first and second active backplanes 146 and 148 are connected together.

Each of the active backplanes 146 and 148 may be an Ethernet switch such as the Cisco 2900 switch. The backplanes 146 and 148 divide the Ethernet network into multiple smaller, more efficient collision domains, or segments. Each backplane 146 or 148 provides point-to-point bidirectional communication among computers 142–144 such that each computer has a full bandwidth access to the shared peripherals such as data storage devices 154 and 156. Instead of transmitting information to every device on the network and creating unnecessary traffic, each backplane 146 or 148 determines the exact destination for the data and transmits it only to the port where that device is attached. Each backplane 146 or 148 can also handle multiple transmissions at one time. In the system illustrated in FIG. 3, when one computer sends information destined for another device on the network, the backplane 146 or 148 determines exactly where the data needs to go and creates a temporary connection between the two computers. This connection is a private link that is established only for the time needed to complete the data transmission. Also, unlike shared Ethernet hubs, the backplane 146 or 148 allows multiple simultaneous telephone calls to be handled, thus increasing overall network performance. The backplanes 146 and 148 also provide redundancy in bus access. The use of the redundant backplanes 146 and 148 thus provides scalability for both processor-to-processor communication (as in node-to-node communication) and for processor-to-I/O communication (as in the case of a network-attached RAID device). The processor-to-memory communication bandwidth limitation is obviated by the fact that nodes in a cluster provide processor-to-memory access within the node and do not require LAN access.

Also connected to the active backplanes 146 and 148 are servers 150 and 152. The servers 150 and 152 in turn are connected to the Internet 160. Additionally, multiple network data storage devices 154 and 156 are also connected to the active backplanes 146 and 148 to satisfy data requests from computers 142 and 144 or servers 150 and 152.

The dual backplanes 146 and 148 provide scalability and fault tolerance. Further, multiple servers may perform the same task in an active/active scalable manner. By providing a client process with access to a pool of like servers which are load balanced, the response time for each request is optimized.

Figure 4:
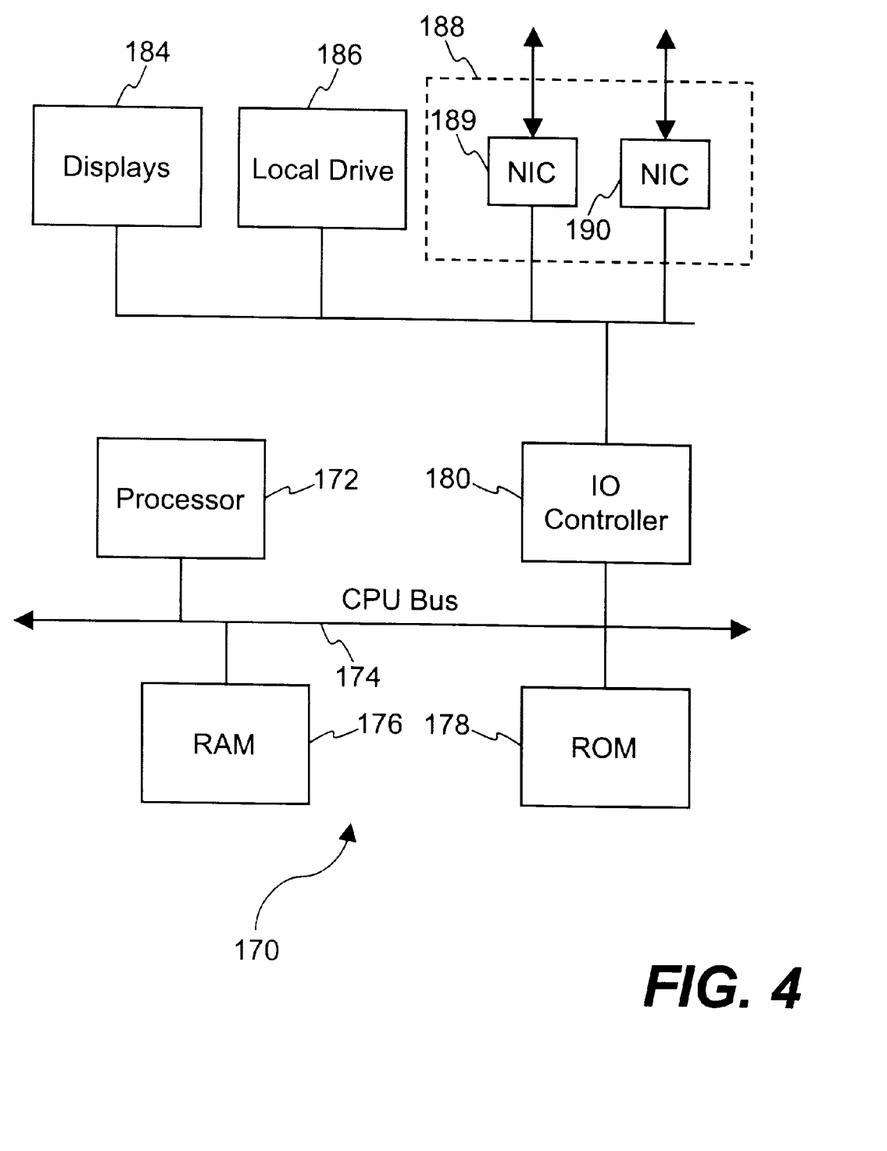
FIG. 4 is a block diagram illustrating a computer node of the computer system of the present invention.

FIG. 4 illustrates the computer 142 in more detail. The computer 142 has a processor 172 which is connected to a processor bus 174. The processor 172 communicates with a random memory access (RAM) 176 and a read-only memory (ROM) 178 over the CPU bus 174. Additionally, the processor 172 communicates with one or more peripheral devices through an I/O controller 180 which is connected to the CPU bus 174. The I/O controller 180 in turn provides an I/O bus 172 for communication with a display device 184, a data storage device 186, a telephone interface card 187, and a network interface system 188.

The telephone interface card 187 may be a D/21H or a D/41H voice board, available from Dialogic Corporation of Parsippany, N.J., and which may support digital SS7, digital E&M, digital loop start, digital DID, analog E&M, analog loop start, and analog DID. Each of the two (D/21H) or four (D/41H) loop start interfaces receives voice and telephony signaling information from the telephone network. Generally, using the interface, analog signal from the cellular switch 100 or 140 is bandpass-filtered and conditioned by the line interface and then applied to a CODER/DECoder (CODEC) circuit. The CODEC filters, samples, and digitizes the inbound analog signal and passes this digitized signal to a digital signal processor (DSP). The DSP then uses Automatic Gain Control to compensate for variations in the level of the incoming analog signal, applies an adaptive differential pulse code modulation (ADPCM) or pulse code modulation (PCM) algorithm to compress the signal and save disk storage space. The DSP also detects the presence of tones—DTMF, MF, or an application defined single- or dual-frequency tone. Thus, inbound telephony signaling (ring detection and loop current detection) are conditioned by the line interface and routed over a control bus to the DSP. The DSP responds to these signals, informs the application of telephony signaling status, and instructs the line interface to transmit outbound signaling (on-hook/off-hook) to the telephone network. When recording speech, the DSP can use different digitizing rates from 24 to 64 kilobits per second (Kb/s) as selected by the application for the best speech quality and most efficient storage. The digitizing rate is selected on a channel-by-channel basis and can be changed each time a record or play function is initiated.

Outbound processing is the reverse of inbound processing.

The DSP processed speech is transmitted to the host processor for storage purposes. When playing back a stored file, voice information is received from the host processor and sent to the DSP, which converts the file into digitized voice. The DSP sends the digitized voice to the CODEC to be converted into analog voice and then to the line interface for transmission to the telephone network. For outbound data, the DSP expands stored, compressed audio data for playback; adjusts the volume and rate of speed of playback upon application or user request; and generates tones—DTMF, MF, or any application-defined general-purpose tone.

The network interface system 188 has a plurality of network interface cards 189–190. The network interface system 188 may be a Netelligent 10/100 TX PCI Intel UTP Controller, available from Compaq Computers Corporation of Houston, Texas. The Netelligent 10/100 unit can operate at 10 or 100 megabits per second (Mb/s) and automatically negotiates to the highest common speed when connected to a network. It has a network fault tolerance feature which enables its Controller to keep an active link by automatically switching to a backup network interface if a network connection fails.

Figure 5:
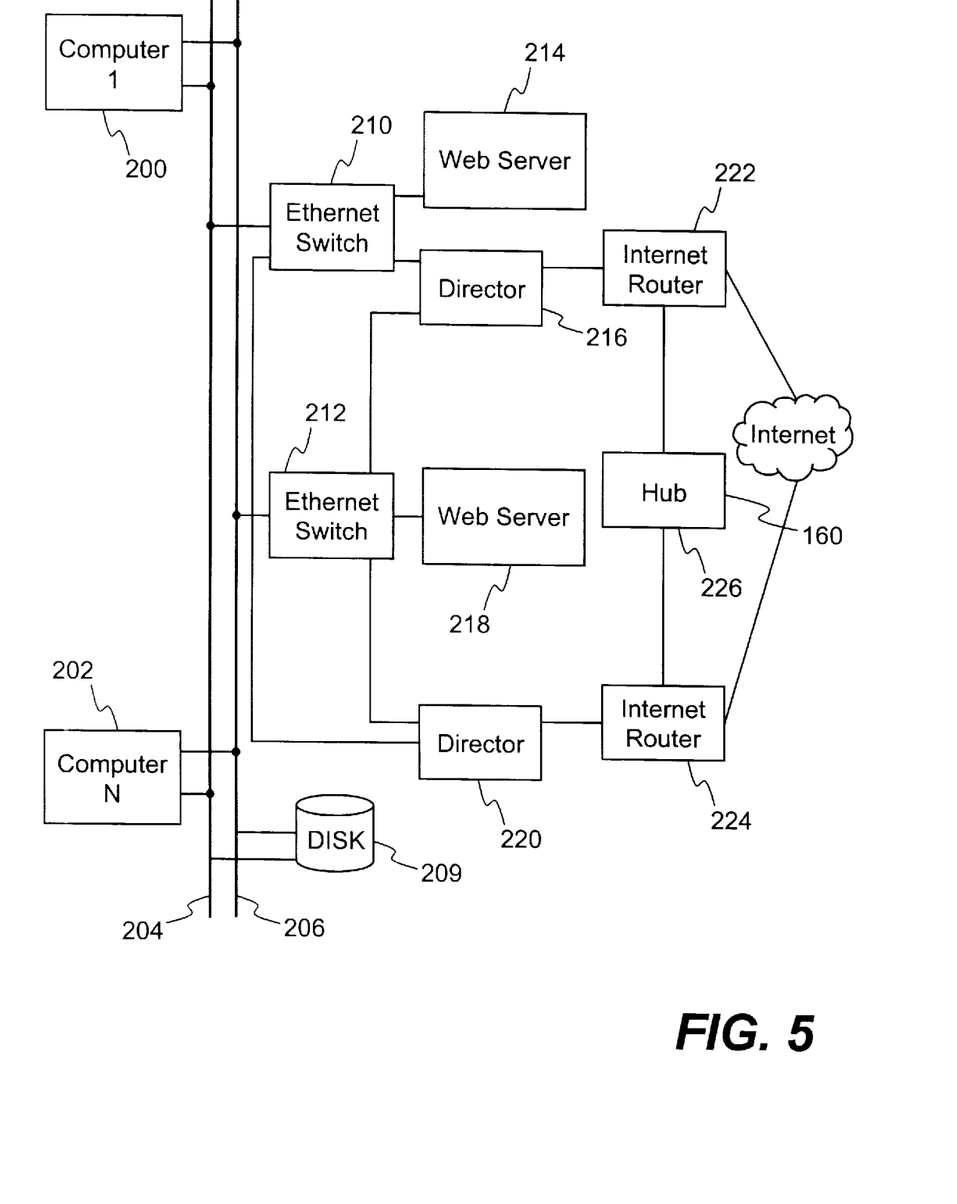
FIG. 5 is a block diagram illustrating a third computer system.

In FIG. 5, another computer system is shown. A plurality of computers 200 and 202 communicate over a dual bus with a first bus 204 and a second bus 206. Additionally, a first Ethernet switch 210 is connected to the first bus 204. The Ethernet switch 210 may be the Cisco 2900 switch. The Ethernet switch 210 in turn is connected to an Internet pool of Web servers 214. Servers 214 support Web content retrieval, email, database management, and system management. The Ethernet switch 210 is also connected to a first director 216 as well as a second director 220. The first director 216 in turn communicates with an Internet router 222. The Internet router 222 is also connected to a hub 226 and to the Internet 160.

Correspondingly, a second Ethernet switch 212 is connected to the second bus 206. The second Ethernet switch 212, which may be the Cisco 2900 switch, is also connected to an Internet Web server 218 and to the second director 220. The second director 220 in turn is connected to an Internet router 224 which is connected to the Internet 160. The Internet router 224 is also connected to the hub 226.

Directors recognize a Universal Resource Locator (URL) or Internet Protocol (IP) address as being associated with a pool of servers. If a server becomes unavailable, the server request is simply put in a slow poll mode and server requests are not sent to it until it starts responding. Directors provide various load-balancing algorithms to even out the load among a pool of servers. These devices assure high availability and scalability. By using directors 216 and 220 within such a clustered system, provisioning active/active pools of servers can be provided using off the shelf components to assure scalable, load balanced, fault tolerant access of clients to all server resources.

Figure 6:
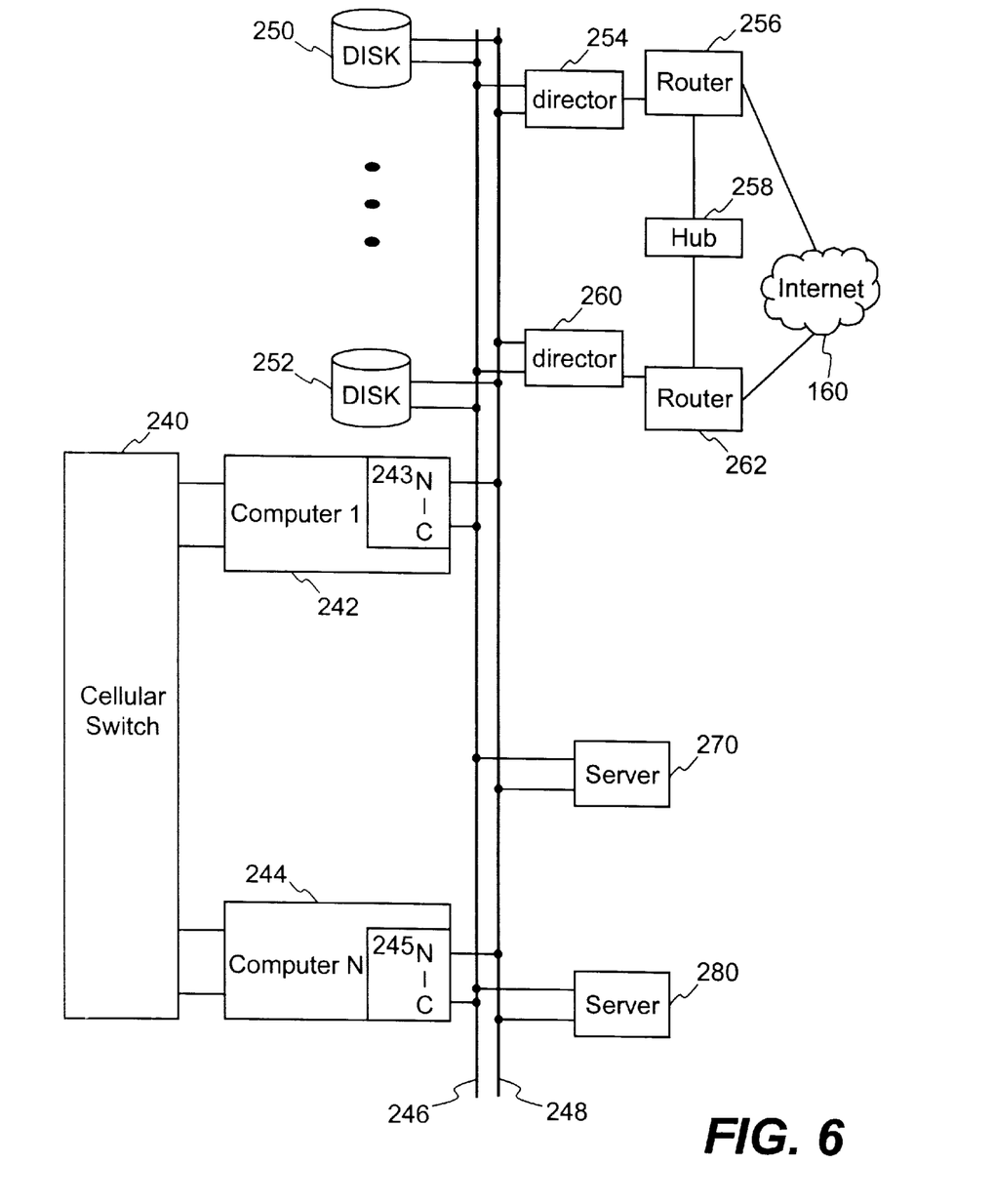
FIG. 6 is a block diagram illustrating a fourth computer system.

FIG. 6 shows yet another embodiment of the invention. Incoming data from the POTS network is received by a cellular switch 240. The cellular switch 240 in turn provides POTS data to computers 242 and 244 over multiple T1 connections for each computer. Each of computers 242 and 244 in turn is connected to a dual backplane system which is made up of a first active backplane 246 and a second active backplane 248. A plurality of servers 270 and 280 are also connected to the first active backplane 246 and second active backplane 248. Similarly, a plurality of data storage devices 250 and 252 are connected to the first active backplane 246 and the second active backplane 248.

Additionally, multiple directors 254 and 260 are also connected to the first active backplane 246 and the second active backplane 248. Each of the directors 254 and 260 is connected to each of routers 256 and 262. The routers 256 and 262 communicate with each other over a hub 258. The routers 256 and 262 are also connected to the Internet 160.

The deployment of the dual backplanes 246 and 248 and directors 254 and 260 allows many servers to perform the same task in an active/active scalable manner. By providing a client process with access to a pool of like servers which are load balanced, the system minimizes the response time for each request.

Figure 7:
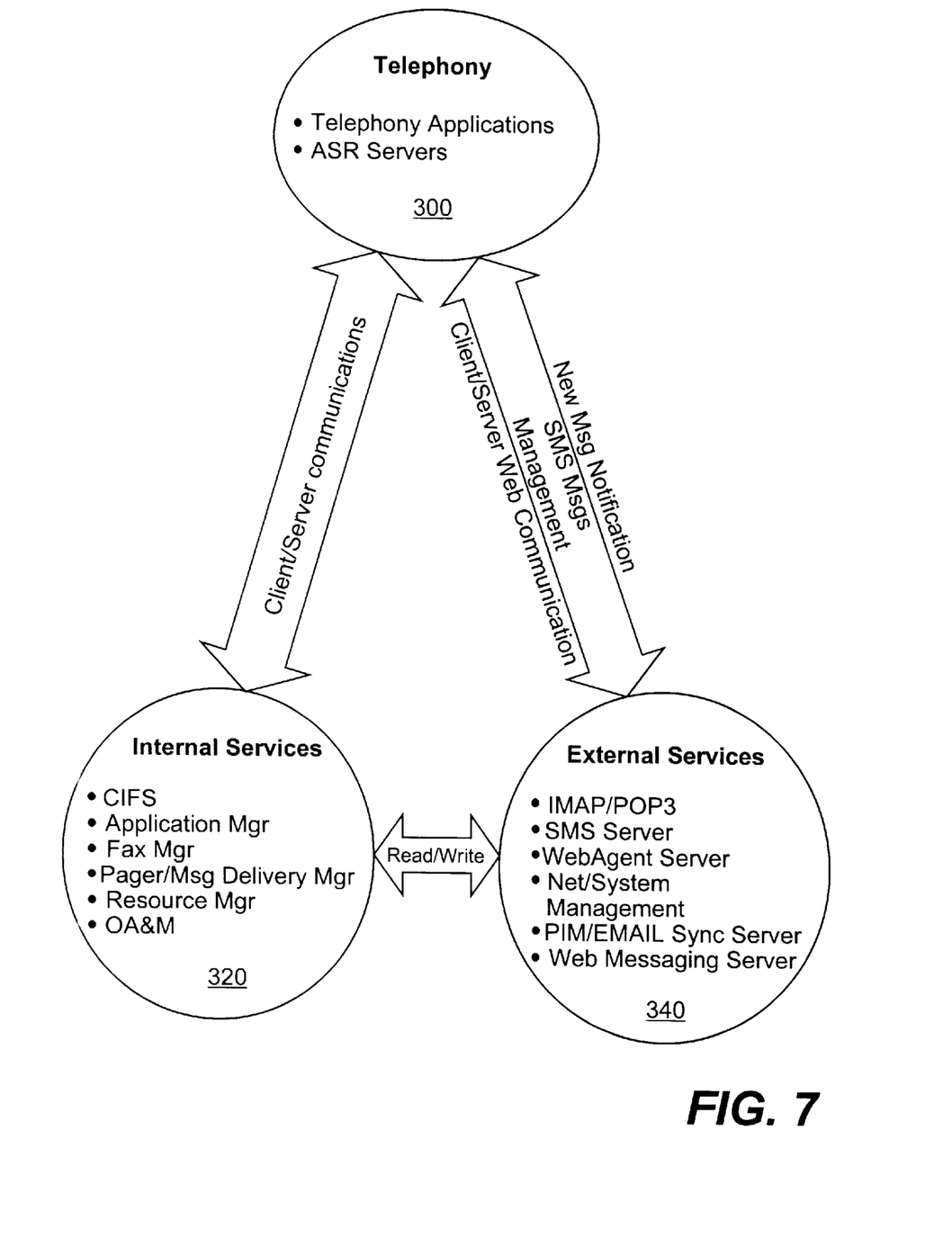
FIG. 7 is a diagram of software supported by the computer system of the present invention.

Turning now to FIG. 7, an overview of processes executing on the computer systems described above are shown. These processes include a telephony process 300 which is a collection one or more telephony application modules and an automatic speech recognition (ASR) server module. The telephony group 300 communicates with an internal services process 320 via client/server communications. The internal services process 320 is a collection of software such as a CIFS application module, an application manager module, a facsimile manager module, a pager and message delivery manager module, a resource manager module, and an operation and administration (OA&M) manager module. The external services process 340 is a collection of services which handle tasks such as Internet Message Access Protocol 4 (IMAP4)/Post Office Protocol 3 (POP3) electronic mail, Short Message System (SMS) server, Web agent server, network and system management module, personal information management/electronic mail synchronization server module, and Web messaging server module.

The electronic mail server sends and receives messages using IMAP4 and POP3 SMTP protocols. The electronic mail server uses the same file store methods as the telephony application servers, thus supporting the abstraction of a unified mailbox to the phone as well as to the desktop. The Web server implements the Web user interface for message access, service management, system management, PIM synchronization, and Internet data collection. Through Active-X and Java applets or scripts, unified messages can be accessed over the Internet using Web browsers such as Microsoft Internet Explorer and Netscape Navigator. The user can use a Web browser to access his or her calendar, address book, and to-do list. The user can also access the Web server from the Internet to add or change services and configure service parameters. With the help of forms and menus, the user may interact with configuration parameters. Further, limited access to service parameters is supported over the telephone user interface.

The Personal Information Manager module manages a user's address book, calendar, and to-do list. An address book may contain entries with fields for name, title, company address, business phone, mobile phone, home phone, fax, electronic mail, Web page address and notes. A calendar may keep track of appointments, with features such as subject/agenda, location, date/time, and appointment length. A to-do list keeps track of things that need to be done. The to-do list entry may provide fields for subject/agenda, priority, due date/time, and reminder notes. The system can page, call or send electronic mail with to-do list content. PIM synchronization over the Web is provided to make information on palm-top computers available to the user at any time anywhere by telephone or Web client access. The Web server is the gateway to handle this synchronization.

Figure 8:
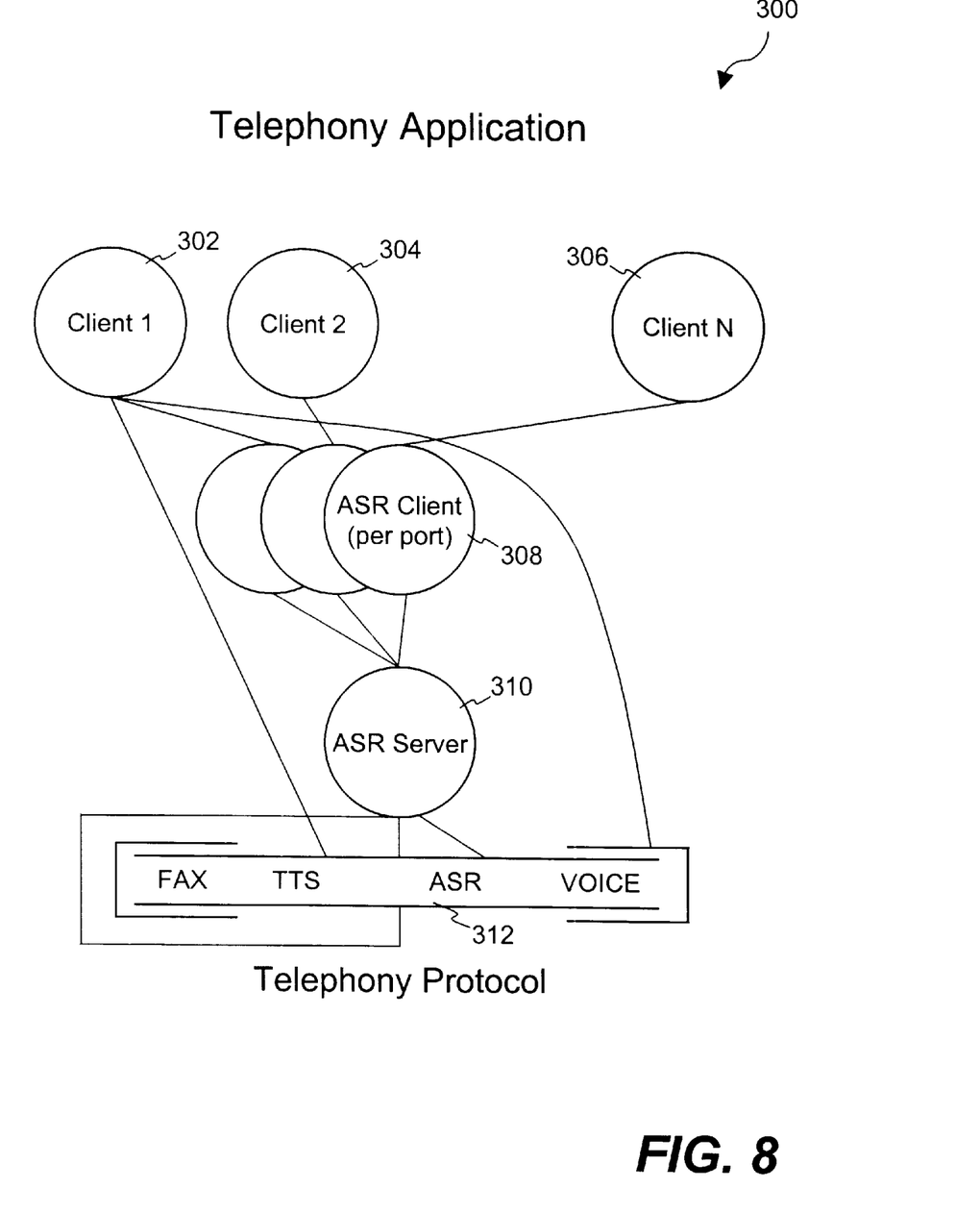
FIG. 8 is a diagram of a telephony module supported by the compute system of the present invention.

The telephony module 300 is illustrated in more detail in FIG. 8. In the telephony module 300, multiple client application module 302, 304 and 306 communicate with one or more automatic speech recognition (ASR) client module 308, one of which is assigned per communication port. The ASR client module 308 in turn communicates with an ASR server 310 which handles the speech recognition task. The ASR server software may be the Nuance-6 software, available from Nuance Communications of Menlo Park, Calif. The ASR server 310 enables speech recognition applications that allow users to talk to computers as if they were speaking with human agents. The ASR server 310 may utilize linguistic and statistical models to interpret and understand natural human speech to provide high recognition accuracy across a range of devices, languages, applications and vocabularies. The scalable client/server architecture of the system handles call volumes and vocabularies of all sizes while providing high reliability. Additionally, each client module 302, 304 and 306 also communicates over a telephony protocol 312 which supports facsimile, text, automatic speech recognition and voice processing.

Telephony application servers use the same file store methods as the electronic mail server. Users send and receive voice and fax messages and convert the electronic mail and Web text to speech using the telephony application. Electronic mail is sent to and from an IMAP4 electronic mail server which uses the same message store as the telephony application. In this way, the user is presented with the abstraction of a unified mailbox and advanced Web services both from the phone as well as the desktop.

When a server for telephony applications 300 goes down, all the ports in that node are lost. Since no shared services are implemented in the application servers, no fail-over is required. All ongoing calls on that server are dropped. The bus 204 or 206 will route new calls to the remaining telephony application servers.

Figure 9:
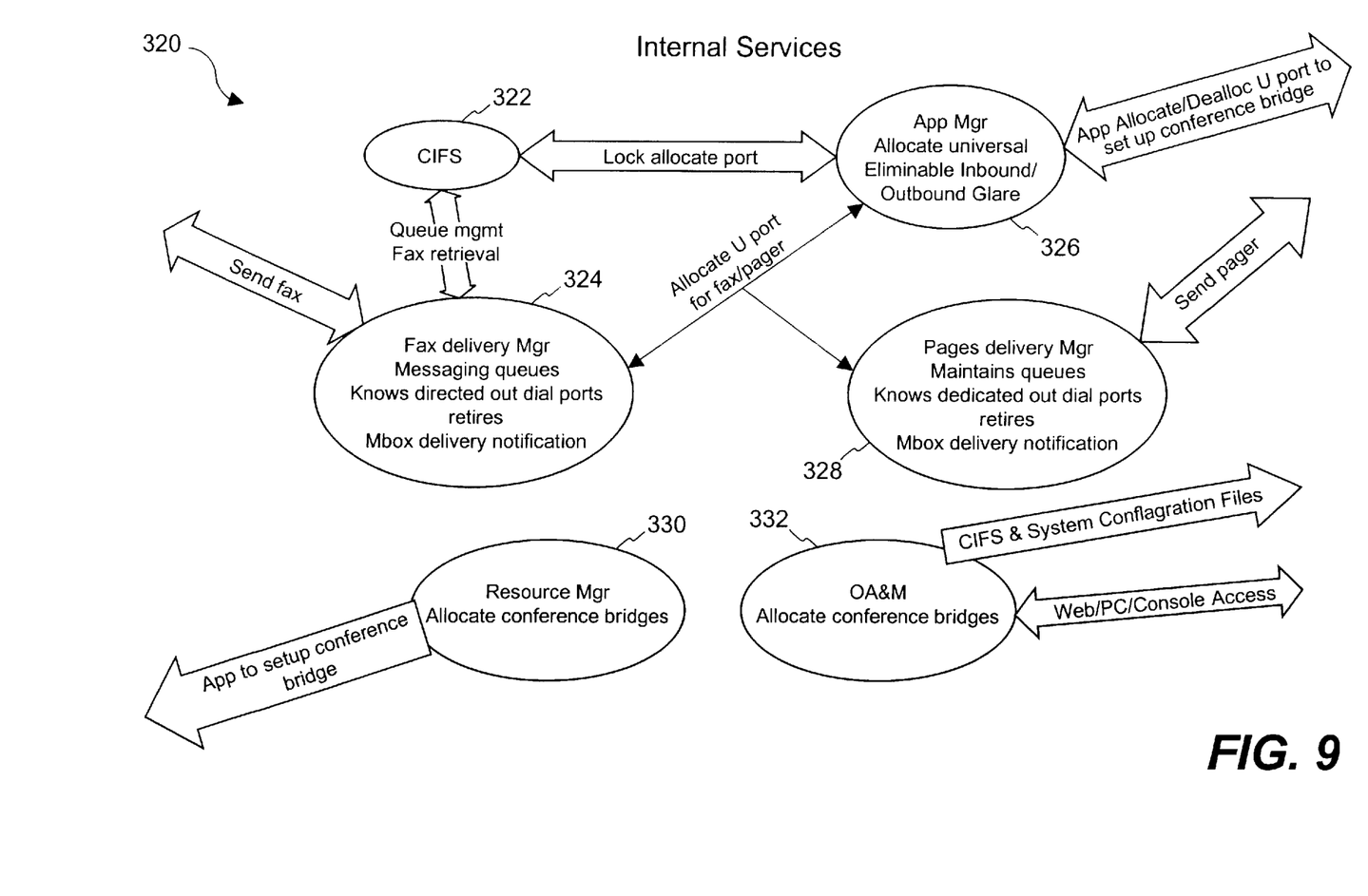
FIG. 9 is a diagram of an internal services module supported by the computer system of the present invention.

FIG. 9 shows the internal services module 320 in more detail. A file sharing protocol handler 322 processes requests from client applications so that they can read and write to files or request services from server programs in the computer network. In this case, the file sharing protocol handler is a CIFS handler. By using CIFS locking strategies, system wide resources and queues can be processed locally and in parallel with peer servers such as resource managers, application managers, pager/outdialer managers, and fax managers. The lock technique improves parallelism and scalability while reducing load balancing and fail-over complexity.

The CIFS file protocol handler 322 implements requests from one or more application commands such as allocate and lock. The application manager 326 allocates one or more universal ports, eliminates redundant inbound/outbound requests, and allocates and deallocates universal ports to set up various conference bridges as necessary.

The application manager 326 also communicates with a fax delivery manager 324 and a pager delivery manager 328. The fax delivery manager 324 maintains fax queues and is aware of the availability of dedicated and/or dynamically allocated dial-out ports. The fax delivery manager 324 is also responsible for retrying fax delivery if necessary. The fax delivery manager 324 communicates with the CIFS software 322 information regarding the fax queue management as well as the fax retrieval process. The pager delivery manager 328 maintains the pager queues and is aware of the dedicated and/or dynamically allocated dial-out ports. It also manages the retry of the pager delivery process. The internal services module 320 also contains a resource manager 330 which allocates the available conference bridges. The internal service module 320 also has a OA&M (Operations, Administration and Maintenance) manager 332 which supports mailbox, port and disk utilities.

Figure 10:
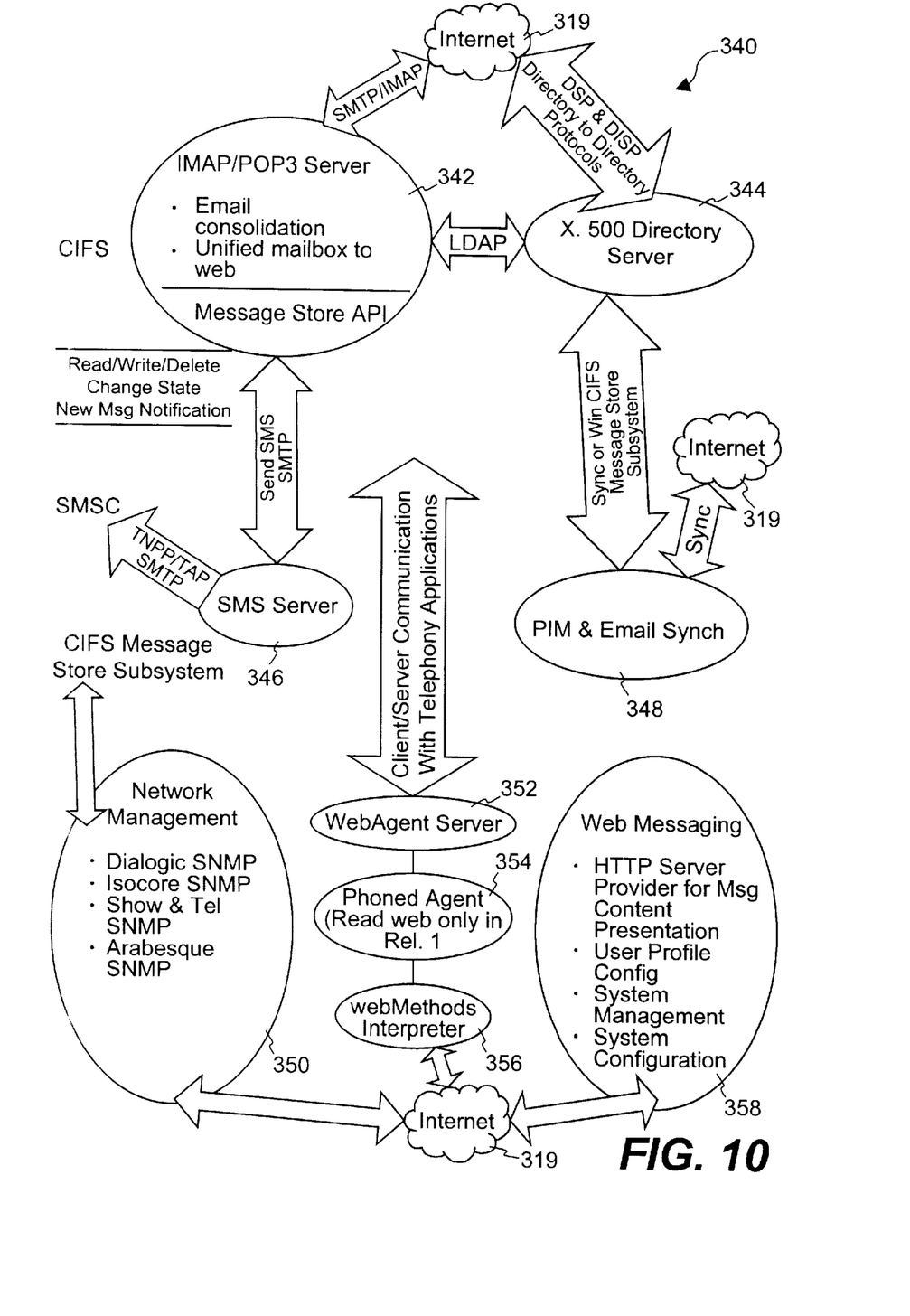
FIG. 10 is a diagram of an external services module supported by the computer system of the present invention.

FIG. 10 shows the external services module 340 in detail.

The external services module 340 contains an IMAP4/POP3 electronic mail server 342. The server 342 handles electronic mail consolidation and unifies the mailbox access to the Web.

The IMAP4/POP3 server 342 communicates using an LDAP (Lightweight Directory Access Protocol) to an X.500 directory server 344. LDAP is a standard capable of providing open access to directory services on the Internet, as well as integrating directories and providing a global directory service. X.500 is a standard produced by the ISO/ITU defining the protocols and information model for a global directory service that is independent of computing application and network platform. The X.500 standard defines a specification for a rich, global, distributed directory based on hierarchically named information objects (directory entries) that users can browse and search. X.500 uses a model of a set of Directory Servers (DSAs), each holding a portion of the global Directory Information Base (DIB). The DSAs co-operate to provide a directory service to user applications in a way which means these applications need not be aware of the location of the information they are accessing.

The IMAP4/POP3 server 342 and the X.500 directory server 344 in turn communicates over the Internet 319. Further, the IMAP/POP3 server 342 communicates with an SMS server 346. Additionally, the X.500 directory 344 communicates with a personal information management (PIM)-electronic mail synchronization system 348. The PIM-electronic mail synchronizer 348 in turn communicates with the Internet 319 such that a user can synchronize his PIM and electronic mail over the Internet.

Additionally, the external services module 340 contains a network management module 350 which acts as an interface to the CIFS message store system. The network management module 350 also communicates over the Internet 319. A system administrator operating the network management module is provided with secure tools to manage the system over the network. Server management, network management, resource management and mailbox management can be all accessed from the Web.

A Web messaging module 358 is provided to act as a service provider for various message content presentations. The Web messaging software 358 also handles user preference configurations stored in the profile for system management and system configuration. Further, the external services module 340 includes a Web agent server 352 which operates in conjunction with a phone agent 354 to process spoken requests from the user for searching or operating applications over the Internet. The phone agent 354 in turn provides commands to a Web methods interpreter 356. The Web methods interpreter 356 translates the verbal request or command to an Internet search and accesses the Internet 319 appropriately. The user can access Internet data such as stock quotes and weather reports from a cellular phone.

The above processes, in conjunction with the computer systems described above, operate in a fault-tolerant and scalable manner. Further, a pool of servers may execute these processes in an active/active scalable manner. The directors provide load balancing among the pool of like servers. By providing the above processes with access to the pool of like servers which are load balanced, the system provides fast response time for each request.

Each of the above described modules or programs can be implemented in a high level procedural or object-oriented programming language to operate in conjunction with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Although a computer system with one or more active backplanes have been disclosed, other suitable network architectures may be used. Further, while the invention has been shown and described with reference to particular embodiments, those skilled in the art will understand that the above and other changes in form and detail may be made without departing from the spirit and scope of the following claims.

What is claimed is:

1. A computer system comprising:
   a plurality of processors, each processor executing an independent operating system image without sharing file system state information;
   an active backplane coupled to the plurality of processors wherein the backplane uses a network protocol to communicate data; and
   one or more data storage devices coupled to the active backplane for satisfying data requests from the plurality of processors using the network protocol, each of the data storage devices being adapted to secure a file when one processor writes to the file and to release the file when the processor completes operation on the file.

2. The computer system of claim 1, wherein the active back plane is a switch.

3. The computer system of claim 2, wherein the switch is an Ethernet switch.

4. The computer system of claim 1, wherein each data storage device is a redundant array of inexpensive disk (RAID) device.

5. The computer system of claim 1, wherein each data storage device is a network data storage device.

6. The computer system of claim 1, further comprising a file sharing protocol supported by the processor and the data storage system.

7. The computer system of claim 6, further comprising means for locking a file on the data storage device.

8. The computer system of claim 6, further comprising a byte range locking means for controlling access to the data storage device.

9. The computer system of claim 1, further comprising a cellular switch coupled to the processors.

10. The computer system of claim 1, further comprising one or more applications selected from a group consisting of telephony applications, speech recognition applications, electronic mail applications, personal information management applications, and Web agent applications.

11. A method for providing file storage in a computer system, comprising:
    executing an independent operating system image on each processor in a plurality of processors without sharing file system state information;
    communicating data over an active backplane coupled to the plurality of processors using a network protocol; and
    transferring data from one or more data storage devices coupled to the active backplane in satisfying data requests from the plurality of processors, each of the data storage devices being adapted to secure a file when one processor writes to the file and to release the file when the processor completes operation on the file.

12. The method of claim 11, wherein the communicating step includes routing data using a switch.

13. The method of claim 12, wherein the switch is an Ethernet switch.

14. The method of claim 11, further comprising storing data in a redundant array of inexpensive disk (RAID) device.

15. The method of claim 11, wherein the transferring step further comprises accessing one or more network data storage devices.

16. The method of claim 11, further comprising communicating data using file sharing protocol.

17. The method of claim 16, further comprising locking a file on the data storage device.

18. The method of claim 16, further comprising locking a byte range on the data storage device.

19. The method of claim 11, further comprising receiving data from a cellular switch coupled to the processors.

20. The method of claim 11, further comprising executing one or more applications selected from a group consisting of telephony applications, speech recognition applications, electronic mail applications, personal information management applications, and Web agent applications.

21. The method of claim 11, further comprising executing one or more applications selected from a group consisting of facsimile applications, synchronization applications, short message system (SMS) delivery applications, and pager applications.

* * * * *